(12) United States Patent
Mckay

(10) Patent No.: US 6,364,371 B1
(45) Date of Patent: Apr. 2, 2002

(54) CONICAL FLANGE INTERFACE FOR RAILWAY APPLICATIONS

(75) Inventor: Albert A. Mckay, Stoney Creek (CA)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/579,735

(22) Filed: May 26, 2000

(51) Int. Cl.[7] .................... F16L 35/00; F16L 55/00
(52) U.S. Cl. .................. 285/363; 285/50; 285/368
(58) Field of Search ................. 285/50, 363, 368, 285/376, 377

(56) References Cited

U.S. PATENT DOCUMENTS 3,850,455 A * 11/1974 Stafford ................. 285/363 X
4,960,296 A * 10/1990 Thelen et al. ................. 285/50
5,018,769 A * 5/1991 Albrecht ................. 285/368 X
5,340,161 A * 8/1994 Bagnulo ................. 285/50

* cited by examiner

Primary Examiner—Neill Wilson
(74) Attorney, Agent, or Firm—James Ray & Associates

(57) ABSTRACT

The present invention provides an apparatus for securing a predetermined fitting to a mating surface. Such apparatus comprises a flange member having a predetermined profile and a swivel member connected to the flange member and having a well defined flange to swivel interface wherein the defined flange to swivel interface is conical with respect to an axis through the centerline of the apparatus.

20 Claims, 2 Drawing Sheets

CONICAL FLANGE INTERFACE FOR RAILWAY APPLICATIONS

FIELD OF THE INVENTION

The present invention relates, in general, to railway flanges and railway fittings and, more particularly, the present invention relates to a design change in the interface between the railway flange and the swivel.

BACKGROUND OF THE INVENTION

Railroad flanges have been used for countless years for installing fittings and couplings on air brake piping systems and other railway pneumatic devices. LOKRING®C fittings have been designed to mate with these standard railway flanges. LOKRING® is a trademark of Westinghouse Air Brake Company. Unfortunately, the railway flange and the LOKRING® fittings are sized such that the flange opening is smaller than the body diameter on all sizes of the LOKRING® fittings. This has forced the manufacture of these components as a two piece weldment as is evident in the prior art drawing in FIG. 1. The two piece weldment is needed to allow for the use of the standard railway flange which has a predetermined profile for a sealing gasket and a well defined flange to swivel interface. In conflict with the opening in the flange the diameter of the body of the LOKRING® fitting is larger than the opening in the flange. The larger body is required to allow for sufficient bearing area of the assembly tool as it forces the driver (swaging ring) onto the body to secure the fitting to the pipe.

Manufacturing the fitting in two pieces and subsequently welding the assembly is a costly and inefficient operation. It is desirable to manufacture the assembly in one piece and to further eliminate the welding step. However, there is a need to maintain the body diameter and the flange exterior gasket profile so as to ensure that existing gaskets will seal effectively. There is also a need to maintain the interface contact area (i.e. body or swivel to flange interface) since there is considerable vibration energy developed in a typical flange fitting as applied to a railway freight car.

SUMMARY OF THE INVENTION

The present invention provides an apparatus for securing a predetermined fitting to a mating surface. Such apparatus comprises a flange member having a predetermined profile and a swivel member connected to the flange member and having a well defined flange to swivel interface wherein the defined flange to swivel interface is conical with respect to an axis through the centerline of the swivel member. The apparatus also includes a driver member engageable with an outer surface of the swivel member adjacent at least a portion of one end thereof for securing the swivel member to one of a tube and a pipe.

In an embodiment of the invention the apparatus further includes a cavity formed in the apparatus between the flange member and the swivel member for receiving an elastomeric gasket.

In another embodiment of the invention there is an apparatus for securing a pipe disposable on a railway vehicle to a mating surface. The apparatus comprises a flange member having a predetermined profile and a swivel member movably engaged with to the flange member and having a defined flange to swivel interface, wherein the defined flange to swivel interface is substantially conical with respect to a longitudinal axis disposed through a centerline of the swivel member. There is a driver member engageable with an outer surface of the swivel member adjacent at least a portion of one end thereof for securing the swivel member to such pipe.

OBJECTS OF THE INVENTION

It is, therefore one of the primary objects of the present invention to provide a flange and fitting that will eliminate the welding step.

Another object of the present invention is to provide a flange and swivel that can be manufactured as one piece.

Yet another object of the present invention is to provide a flange and swivel that has a conical interface between the flange and the swivel.

It is still another object of the present invention to provide a railway flange and swivel that can be manufactured at a reasonable cost.

These and other objects and advantages of this invention will become apparent after a full reading of the following detailed description, particularly, when read in conjunction with the attached drawings as described below and the appended claims.

Figure 1:
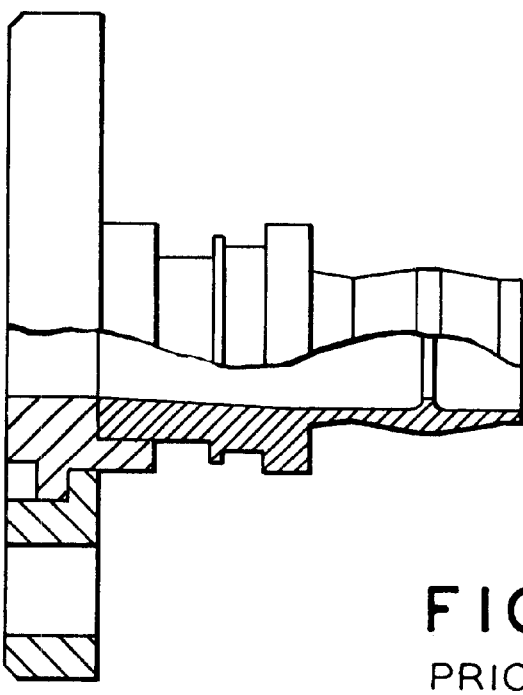
FIG. 1 is a partial cross sectional view of a prior art standard railway flange and a LOKRING® fitting showing a weldment.

BRIEF DESCRIPTION OF THE PRESENTLY PREFERRED AND VARIOUS ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

In the past, prior to the advent of swaging type fittings, the swivel was traditionally welded to the pipe and then the pipe with the swivel attached was connected to a flange on a mating piping piece. In prior art formats, after the advent of swaging type fittings, illustrated in FIGS. 1 and 2, the flange and swivel were manufactured as separate entities with the swivel being welded to the flange. The swivel provided a clamping surface by which the flange was allowed to secure the assembly to a mating part. The swivel also secured and sealed against the gasket in the gasket cavity. With the use of this type of fitting where the swivel was not welded to the pipe a different problem emerged. The flange opening was smaller than the body diameter on all sizes of the swaging type fittings. This forced the manufacture of these components as a two piece weldment as is evident in the prior art drawing illustrated in FIG. 1.

Figure 3:
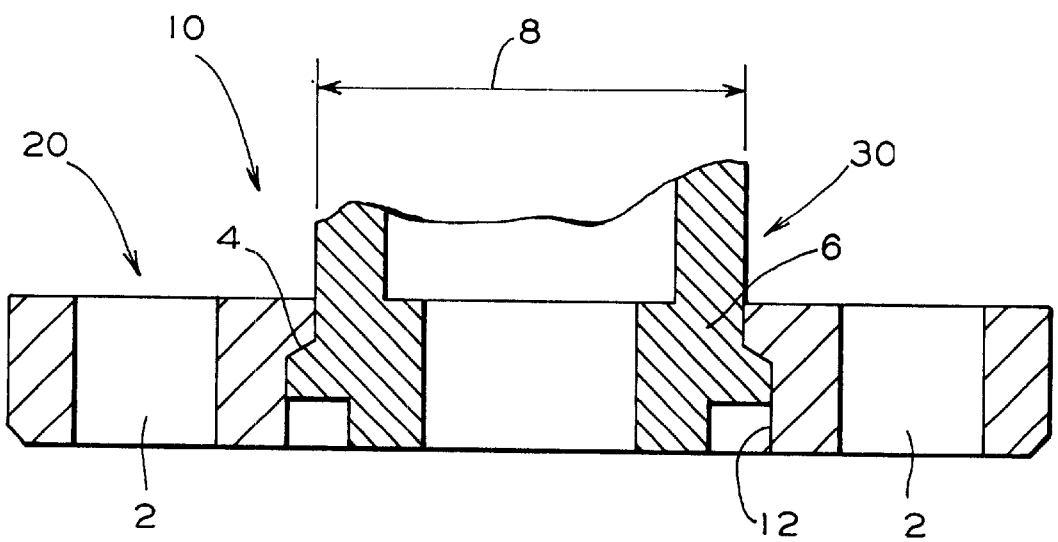
FIG. 3 is a cross sectional view of a railway flange and swivel according to a first embodiment of the invention.

Illustrated in FIG. 3 is an embodiment of the invention. An apparatus, generally designated as 10, is used for securing a fitting to a mating surface. The apparatus 10 comprises a flange member, generally designated as 20, having a predetermined profile and a swivel member, generally designated 30, which is connected to the flange member 20.

Such flange member 20 has two bolt holes 2 for securing the swivel member 30 to a pipe bracket or some other railway piping. The swivel member 30 contacts the flange member 20 at a clamp surface 4. The clamp surface 4 is important in order to insure that sufficient area is provided to control the clamping pressure between the swivel member 30 and the flange member 20. Clamp surface 4 is the interface between the swivel member 30 and the flange member 20. In previous devices such an interface was a flat face interface that was perpendicular to a centerline axis of the assembly. Such a flat face interface is evident in the prior art drawings FIGS. 1 and 2.

Figure 4:
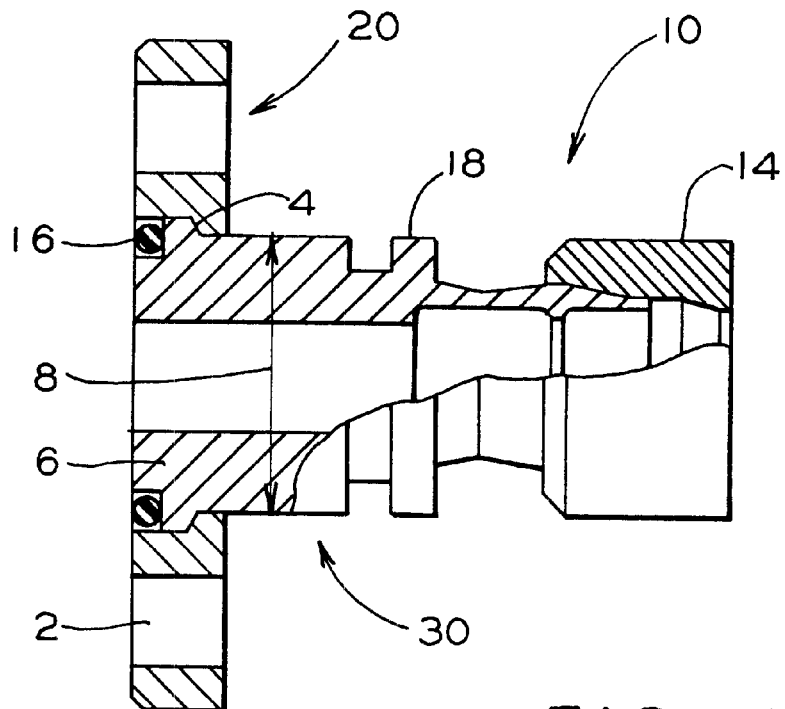
FIG. 4 is a partial cross sectional view of a one piece railway flange and fitting according to an embodiment of the invention.

In the presently preferred embodiment of the invention such interface or clamp surface 4 is conical with respect to the same centerline axis of the swivel member 30. The use of such conical interface or clamp surface 4 restores the required interface surface area while utilizing a larger through bore in the body 6 of the swivel member 30. The larger through bore in the body 6 of the swivel member 30 provides the necessary strength in the apparatus 10 without the need for welding the swivel member to the flange member, as is shown in prior art FIG. 1. The strength is necessary when the driver 14 (or swaging ring) is used on the body 6 of the swivel member 30 to secure the fitting to a pipe or a tube. Illustrated in FIG. 4 is an embodiment of the invention of a one piece railway flange 20 and swivel 30 showing the larger through bore of swivel body 6. Also shown in FIG. 4 is a driver 14, also referred to as a swage ring, which is used to secure the swivel member 30 to railway piping.

The strength is necessary when an assembly tool (not shown) is used to force the driver 14 (or swaging ring) on to the body 6 of such swivel member 30 in order to secure the fitting to a pipe. A portion of the body 6 of swivel member 30 is deformable when the driver 14 is forced overtop of the body 6 to secure the fitting to a pipe or tube. Boby 6 of swivel member 30 also includes a stop flange 18 for limiting the inward movement of the driver 14.

Figure 2:
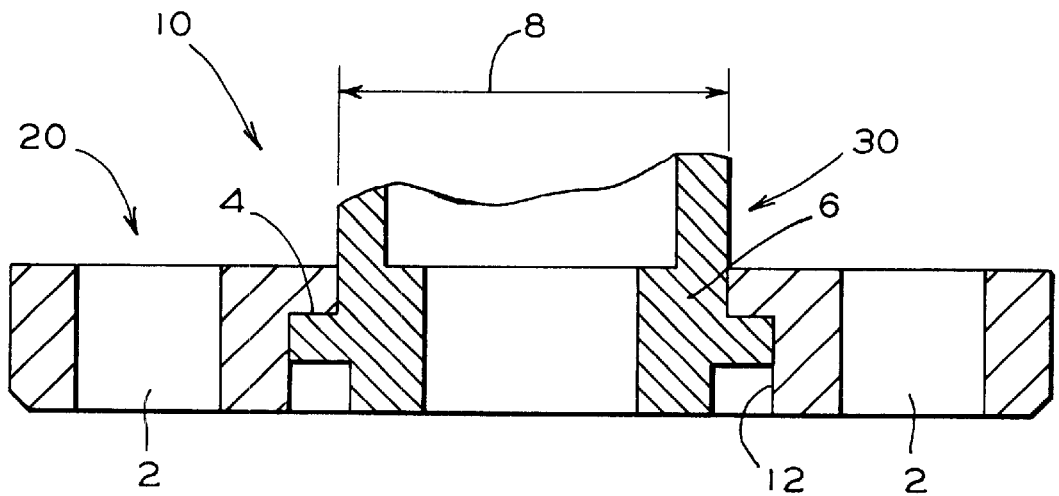
FIG. 2 is a prior art cross sectional view of a railway flange and a swivel.

It is quite evident in the comparison of the drawing shown in FIG. 3 which illustrates the instant invention with the drawing of the prior art assembly shown in FIG. 2 that the swivel body diameter 8 is significantly greater in apparatus 10 of the instant invention. The swivel body diameter 8 is the main body diameter and was reason for the need of the present invention since the body by the design of the sealing connection between the swivel member 30 and the pipe (not shown) must be larger than that available in the prior art swivel before it was welded.

A further benefit that is derived from the use of a conical interface or clamp surface 4 is increased strength of the flange member 20 and the swivel member 30 due to reduced stress concentration points. This is achieved as a result of the smoother flow of material around a more gentle corner.

The apparatus 10 further includes a cavity 12 which is formed between flange member 20 and swivel member 30 for receiving a gasket 16. An elastomeric gasket 16 is placed in the cavity 12 to form a seal between the swivel member 30 and the mating surface. It is important that the profile of the gasket sealing cavity 12 be the same as with previous fittings to ensure that existing gaskets will have a proper seal with the new apparatus 10. It is presently preferred that such elastomeric gasket 16 be made of rubber. It is within the scope of the invention that such sealing member be an O-ring.

It is also presently preferred that a similar material be used to make both the flange member 20 and the swivel member 30. The presently preferred material is a type 15V24 micro alloyed carbon steel.

In another embodiment of the invention such apparatus 10 is specifically intended for use in a railroad application wherein the swivel member 30 receives a pipe disposable on a railway vehicle with another mating surface.

While both the presently preferred and a number of alternative embodiments of the present invention have been described in detail above it is understood that various other adaptations and modifications of the present invention can be envisioned by those persons who are skilled in the relevant railway art without departing from either the spirit of the invention or the scope of the appended claims.

I claim:

1. An apparatus for securing a predetermined fitting to a mating surface, said apparatus comprising:
    (a) a flange member;
    (b) a swivel member movably engaged with said flange member and having a defined flange to swivel interface, wherein said defined flange to swivel interface is substantially conical with respect to a longitudinal axis disposed through a centerline of said swivel member; and
    (c) a driver member engageable with an outer surface of said swivel member adjacent at least a portion of one end thereof for deforming said swivel member inwardly so as to form a connection between said swivel member and one of a tube and a pipe.

2. An apparatus for securing a fitting to a mating surface, according to claim 1, wherein said apparatus further includes a sealing means for forming a seal between said apparatus and a mating surface.

3. An apparatus for securing a fitting to a mating surface, according to claim 2, wherein said sealing means includes a cavity formed between an inside surface of said flange member and at least one exterior surface of said swivel member.

4. An apparatus for securing a fitting to a mating surface, according to claim 3, wherein said cavity is formed having two sides of said cavity formed in said swivel member and a third side formed in said flange member.

5. An apparatus for securing a fitting to a mating surface, according to claim 3, wherein said sealing means includes a gasket.

6. An apparatus for securing a fitting to a mating surface, according to claim 5, wherein said gasket is disposed in said cavity.

7. An apparatus for securing a fitting to a mating surface, according to claim 5, wherein said sealing gasket is made of an elastomeric material.

8. An apparatus for securing a fitting to a mating surface, according to claim 7, wherein said elastomeric material is rubber.

9. An apparatus for securing a fitting to a mating surface, according to claim 3, wherein said sealing means includes an O-ring.

10. An apparatus for securing a fitting to a mating surface, according to claim 1, wherein said swivel member is disposed for receiving one end of a tube section.

11. An apparatus for securing a fitting to a mating surface, according to claim 1, wherein said portion of said swivel member is deformable.

12. An apparatus for securing a fitting to a mating surface, according to claim 1, wherein said swivel member further includes a stop flange for limiting movement of said driver member over said swivel member.

13. An apparatus for securing a fitting to a mating surface, according to claim 1, wherein said flange member further includes a means for securing said flange member to a mating surface.

14. An apparatus for securing a fitting to a mating surface, according to claim 13, wherein said means for securing said flange member includes bolts.

15. An apparatus for securing a fitting to a mating surface, according to claim 1, wherein said flange member and said swivel member are made of a similar material.

16. An apparatus for securing a pipe disposable on a railway vehicle to a mating surface, said apparatus comprising:
   (a) a flange member;
   (b) a swivel member movably engaged with to said flange member and having a defined flange to swivel interface, wherein said defined flange to swivel interface is substantially conical with respect to a longitudinal axis disposed through a centerline of said swivel member; and
   (c) a driver member engageable with an outer surface of said swivel member adjacent at least a portion of one end thereof for deforming said swivel member inwardly so as to form a connection between said swivel member and such pipe.

17. An apparatus for securing a railway pipe to a mating railway surface, according to claim 16, wherein said apparatus further includes a sealing means for forming a seal between said apparatus and such mating surface.

18. An apparatus for securing a railway pipe to a mating railway surface, according to claim 17, wherein said sealing means includes a cavity formed between an inside surface of said flange member and at least one exterior surface of said swivel member.

19. An apparatus for securing a railway pipe to a mating railway surface, according to claim 18, wherein said cavity is formed having two sides of said cavity formed in said swivel member and a third side formed in said flange member.

20. An apparatus for securing a railway pipe to a mating railway surface, according to claim 17, wherein said sealing means includes a gasket.

\* \* \* \* \*